United States Patent [19]

McMillen

[11] 4,372,381
[45] Feb. 8, 1983

[54] METHOD FOR RECOVERY OF OIL FROM TILTED RESERVOIRS

[75] Inventor: James M. McMillen, Arlington, Tex.

[73] Assignee: Mobil Oil Corporation, New York, N.Y.

[21] Appl. No.: 253,120

[22] Filed: Apr. 10, 1981

[51] Int. Cl.³ .......................................... E21B 43/22
[52] U.S. Cl. .................... 166/263; 166/274
[58] Field of Search ............... 166/263, 268, 272, 273, 166/274, 275, 305 R

[56] References Cited

U.S. PATENT DOCUMENTS

| Re. 24,873 | 9/1970 | Lindauer, Jr. ............ | 166/268 |
|---|---|---|---|
| 1,872,906 | 8/1932 | Doherty .................... | 166/268 X |
| 1,885,807 | 11/1932 | Doherty .................... | 166/263 |
| 2,048,731 | 7/1936 | Doherty .................... | 166/274 |
| 3,215,198 | 11/1965 | Willman ................... | 166/268 X |
| 3,223,157 | 12/1965 | Lacey et al. ............. | 166/273 X |
| 3,252,512 | 5/1966 | Baker et al. ............. | 166/263 |
| 3,455,389 | 7/1969 | Gogarty ................... | 166/274 |
| 3,519,076 | 7/1970 | Walker ..................... | 166/263 |
| 3,815,678 | 6/1974 | Terry et al. ............. | 166/272 |
| 4,278,129 | 7/1981 | Walton ..................... | 166/263 |

FOREIGN PATENT DOCUMENTS

| 851515 | 9/1970 | Canada ................................ | 166/263 |
|---|---|---|---|
| 895247 | 3/1972 | Canada ................................ | 166/305 R |
| 1016862 | 9/1977 | Canada ................................ | 166/272 |

*Primary Examiner*—Stephen J. Novosad
*Assistant Examiner*—George A. Suchfield
*Attorney, Agent, or Firm*—Charles A. Huggett; James F. Powers, Jr.; Lawrence O. Miller

[57] ABSTRACT

A method for recovering oil from a tilted oil-bearing reservoir having a water zone in fluid communication with and directly below an oil zone wherein a large amount of solvent is injected along the water-oil interface so that a part of the solvent fingers into the oil, lowering its viscosity and making the oil more mobile for production. The remainder of the solvent is driven through the reservoir by a water flood wherein the rate is controlled slow enough that gravity minimizes fingering of the water into the oil layer, sweeping oil toward the production well. Solvent stimulation of the producing well provides additional incremental recovery and encourages the flooded oil toward the production well.

24 Claims, 4 Drawing Figures

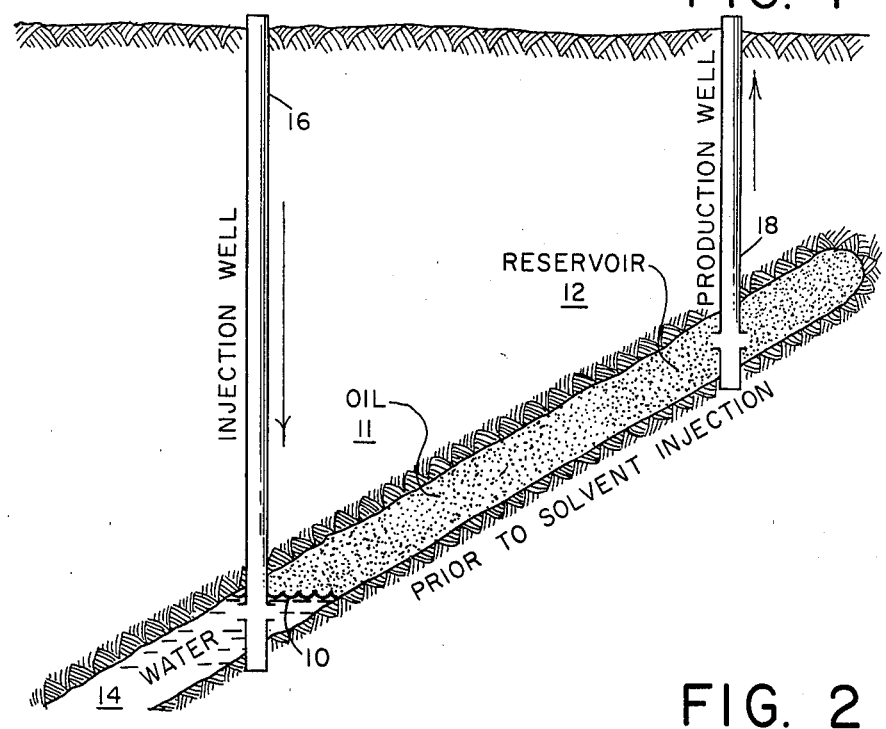
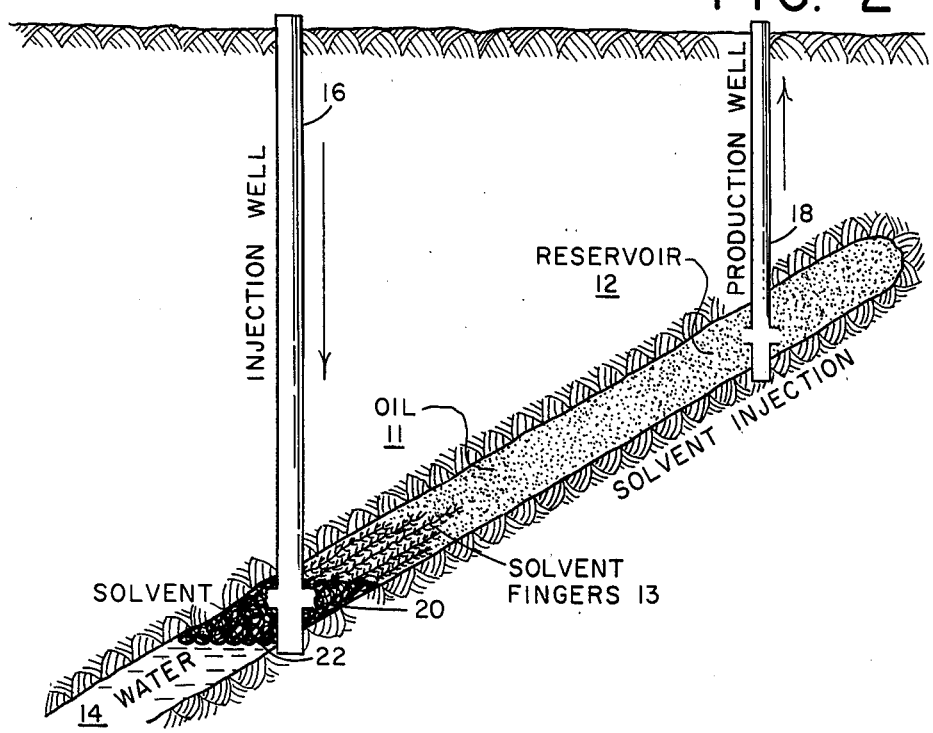

METHOD FOR RECOVERY OF OIL FROM TILTED RESERVOIRS

BACKGROUND OF THE INVENTION

1. Field of the Invention

This invention relates to a method for recovering oil from tilted oil reservoirs, preferably 10 degrees or more, having an underlying body of water in contact with the oil zone. More particularly, this invention relates to injecting a miscible solvent into the lower portion of the reservoir in the vicinity of the interface between the water and the oil wherein the solvent fingers upwardly into the oil reducing its viscosity and thereafter driving any remaining solvent and the lower viscosity solvent-oil mixture through the reservoir by water towards a spaced production well where reservoir oil is recovered.

2. Description of the Prior Art

In the recovery of oil from tilted oil-bearing reservoirs, it is known to inject a fluid which is miscible with the oil into the upper portion of the reservoir and drive the fluid down through the reservoir so as to displace the oil toward a production well in the lower portion of the reservoir where the oil is recovered. This type of process is disclosed in U.S. Pat. Nos. 3,223,157 to Lacey et al. and 3,312,278 to Warden. In this type process, the miscible fluid does not tend to finger and dissolve into the oil because of the gravity effect tending to "float" the fluid above the reservoir oil.

As disclosed in U.S. Pat. No. 3,223,157 to Lacey et al. discussed above, for economic reasons the solvent is normally injected as a slug followed by another fluid such as a gas or an aqueous fluid or a combination of water and gas to drive the solvent slug and the oil through the reservoir.

In displacement processes in general, the idea sought after is piston-like displacement. That is, the displacing fluids should ideally present a flat front to the oil in the reservoir and displace it uniformly through the reservoir. Most miscible slugs are followed by water to drive them through the reservoir. Moreover, since most miscible solvent slugs used are light hydrocarbons with viscosities and densities less than the reservoir oil, the solvent will tend to finger through the more viscous reservoir oil due to viscous fingering and gravity segregation, destroying piston-like displacement. The water will have a tendency to follow the solvent finger resulting in premature breakthrough of the displacing medium water.

The present process takes advantage of the fingering effect of a miscible solvent having a viscosity and density less than the reservoir oil by injecting a large amount of solvent in the lowest portion of a tilted reservoir. The less viscous solvent fingers into the oil reducing its viscosity and making the oil easier to produce. In the case of a tilted reservoir having an underlying body of water, the solvent is injected in the vicinity of the oil-water interface. Water is then injected into the reservoir to drive the solvent and oil toward a production well where the oil is recovered. In the present process, the rate of water injection is controlled slow enough so that the more dense water does not finger into the solvent or solvent-oil mixture destroying piston-like displacement and resulting in the water bypassing the oil and breaking through the production well.

SUMMARY OF THE INVENTION

The present invention relates to recovering oil from a tilted subterranean oil reservoir, preferably 10 degrees or more, having an underlying body of water in contact with the oil. A large amount of solvent miscible with the oil is injected into the lower portion of the reservoir in the vicinity of the interface between the water and the oil so that all or part of the solvent fingers undip into the oil thereby lowering its viscosity and making the oil more mobile and easier to produce. Any remaining solvent is driven upward by a water flood through the reservoir so as to further contact the reservoir oil, dissolve and lower the viscosity of the oil and drive the reservoir oil toward a production well where it is recovered. The rate of water injection is controlled slow enough so that the interface between the water and solvent is maintained in a substantially horizontal position to minimize fingering of the water into the solvent or solvent-oil mixture thereby increasing the displacement efficiency of the water. The production well may be solvent-stimulated at any time to provide additional incremental recovery and encourage the flooded oil toward the production well.

BRIEF DESCRIPTION OF THE DRAWINGS

FIG. 1 schematically shows a section of a steeply-dipped oil reservoir penetrated by a plurality of wells; and FIG. 2 schematically shows a section of the reservoir shown in FIG. 1 illustrating the solvent injection phase of the process;

DESCRIPTION OF THE PREFERRED EMBODIMENT

Figure 4:
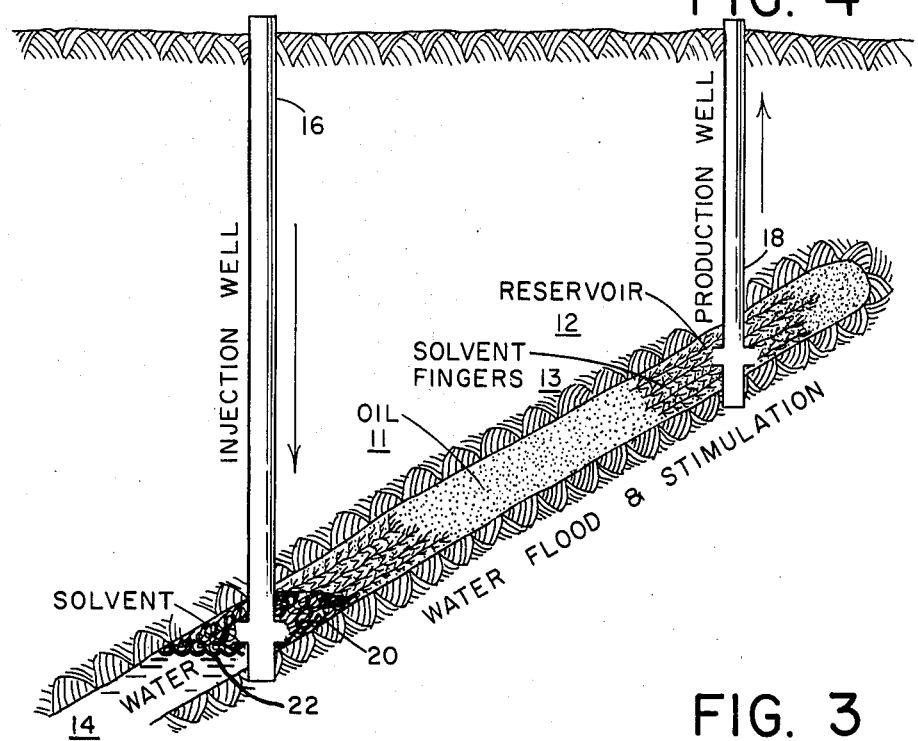
FIG. 4 schematically shows a section of the reservoir shown in FIG. 1 illustrating that phase of the process wherein water is injected into the injection well and the production well is solvent-stimulated.

Referring to FIG. 1 of the drawing, a tilted reservoir 12, preferably 10 degrees or more, is illustrated having an original oil and water interface 10 between the oil-bearing reservoir 12 and the underlying body of water 14. In accordance with the present invention, at least two wells are drilled through the earth from the surface and intersect and are in fluid communication with the tilted reservoir 12. An injection well 16 is located such that its lower end is completed to establish fluid communication with the reservoir 12 near the oil-water interface 10 in the lower portion of the reservoir. The lower end of the production well 18 is completed to establish fluid communication with the reservoir 12 at a shallower depth in the reservoir than well 16. In the case of a single production well 18 as shown in FIG. 1, the production well is in communication with the most shallow portion of the oil-bearing reservoir 12. However, one or more intermediate wells may be used sequentially as production wells for the reservoir oil.

Referring to FIG. 2 which shows the same formation and well arrangement as shown in FIG. 1, a solvent miscible with and less dense than the reservoir oil 11 in the amount of about 5 to 25% and preferably 10% reservoir pore volume is injected into the reservoir 12 substantially at the interface between the reservoir oil 11 and the water 14 to form slug 20 which forms a smooth horizontal water-solvent interface 22 with the underlying water 14 and essentially no interface with the oil 11 since it fingers into the oil and is readily soluble in the oil. The injected solvent displaces the water zone 14 downward and since the solvent is preferably somewhat more viscous (up to a few centipoise) than the water (about one centipoise) and is less dense than the water, the solvent will not finger or channel into the water 14. The solvent being less dense and much less viscous than the oil 11 will flow upward into contact with the oil and finger into the oil thereby reducing the viscosity of the oil. After the desired amount of solvent has been injected into the reservoir 12, injection is terminated. As illustrated by FIG. 2, at this point the injected solvent will have fingered up to several hundred feet up through the oil 11. These long fingers 13 in the oil provide intimate mixing and large areas for diffusion to take place resulting in a mixture of solvent and reservoir oil having a lower viscosity than the oil alone, thereby making the oil easier to produce. Since not all of the injected solvent fingers into the oil, a small portion of the slug 20 of undiluted solvent will remain between the water 14 and oil 11.

Figure 3:
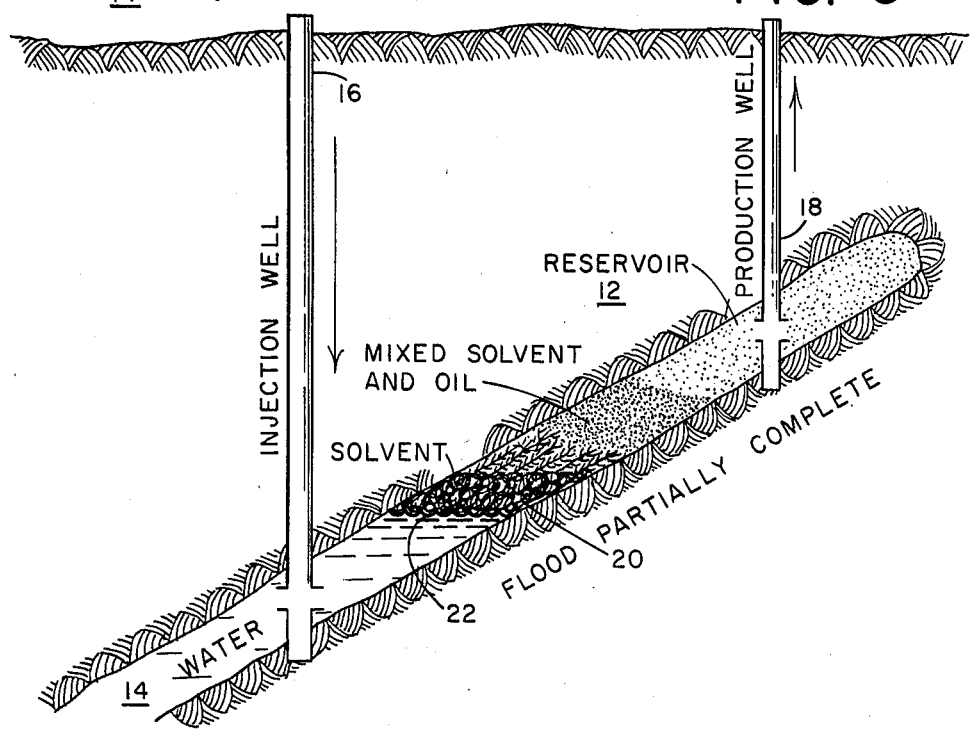
FIG. 3 schematically shows a section of the reservoir shown in FIG. 1 illustrating the water drive and production phase of the process.

As shown in FIG. 3, after a short soak period, water is injected into the reservoir in the vicinity of the water-solvent interface via injection well 16 to displace the undissolved solvent slug 20, which in turn miscibly displaces the oil through the reservoir towards a production well 18 where the oil is produced. The production well 18 in the path of advancing solvent slug 20 will first produce oil, then a mixture of solvent and oil with increasing amounts of solvent, then possibly some unmixed solvent and finally water. When there is a breakthrough of water at the production well 18, production is terminated. During the water drive, an important aspect of the invention is to control the rate of water injection slow enough to minimize fingering of the water into the solvent and thereby increase the driving efficiency of the water. Ideally, the rate of flow should be such that the interface 22 between the solvent slug 20 and water 14 approaches an essentially horizontal position thereby allowing gravity stabilization to have its maximum effect on the system.

The injected solvent can be any gas or liquid that is miscible with the reservoir oil at the pressure and temperature at which it contacts the reservoir oil, while at the same time being less dense than the water and less viscous than the reservoir oil at such a pressure and temperature. Suitable solvents for injection include mixtures of hydrocarbons, such as petroleum fractions, as exemplified by gasoline, naphtha, kerosene, gas oils, diesel oils, light crude oil, "cutter stock," a refinery product used for thinning fuel oil for ships, aromatic containing condensates, mixed aromatic-paraffinic hydrocarbon materials as are sometimes available as waste streams of refinery operations, and the like. In addition, such solvents may include saturated liquid hydrocarbons having from two to ten carbon atoms in the molecules such as ethane, propane, or LPG, butane, pentane, hexane, cyclohexane octane, nonane, decane, and/or their mixtures with each other. Also aromatic hydrocarbons such as benzene, toluene, xylene and aromatic fractions of petroleum distillates may be used or mixtures thereof. Suitably, such solvents may also contain significant quantities of gas dissolved therein such as carbon dioxide which promote diffusion in the reservoir. Gaseous hydrocarbons, e.g., methane, ethane, propane and butane may be used. Carbon dioxide may also be used and is an extremely desirable gas because of its high solubility in hydrocarbons.

The injected solvent may be introduced at an initial rate of up to two to three thousand barrels per day. Frequent monitoring of the production well or wells will reveal whether the solvent has channeled through to the production well. If this occurs, then injection of the solvent is terminated for a short period, such as a week, and injection is then continued at a substantially lower rate, such as one-fourth the previous rate.

In another embodiment of the invention, the production well may be cyclic solvent-stimulated after solvent injection or during water injection. FIG. 4 illustrates solvent stimulation of the production well after solvent injection into the injection well has terminated and water injection is initiated. Concurrently with the injection of water into injection well 16, a suitable stimulation miscible solvent is injected into production well 18 in an amount varying from about 2 to 50 barrels per foot of vertical thickness of the oil-bearing reservoir. After a sufficient amount of stimulation solvent has been injected into the reservoir via the production well 18, injection of the solvent is terminated and well 18 is returned to production. Water injection through injection well 16 continues at a controlled rate slow enough so that the interface 22 between the solvent and driving water approaches a substantially horizontal position to provide maximum displacement efficiency of the water. Water drive and production are continued until the solvent content of the oil being produced drops below 12% by volume, at which point production is terminated and solvent stimulation repeated by injecting a sufficient quantity of solvent into production well 18. During solvent stimulation, water is continuously injected into the reservoir 12 via the injection well 16. These injection/production cycles will continue until the pattern of solvent fraction in the production changes to indicate that solvent fingers 13 from the solvent flood have reached the production well 18. At this point, solvent stimulation is terminated and production is continued by the water drive until there is a breakthrough of water at the production well 18.

Cyclic solvent stimulation provides not only immediate production increases, but also will encourage movement of the flooded oil toward the producing well by providing a pressure sink.

The selection of a suitable miscible solvent for stimulation at the production well will be obvious to a person skilled in the art, having in mind the desire to achieve the desired dilution of the reservoir oil. By way of example, suitable solvents are the same as the flooding solvent injected into the lower portion of the reservoir as previously disclosed.

For the purpose of simplicity in describing the invention, reference has been made to only one injection well and one production well. However, it will be recognized that in practical application of the invention, a plurality of injection wells along the water-oil interface line of the formation and a plurality of production wells may be used and in most cases will be utilized.

While the embodiment of the invention described above and illustrated in the drawings constitute the best mode contemplated for carrying out the invention, it will be apparent that various modifications may be practiced without departing from the spirit of the invention. Thus, the water can be injected into the water zone through a second injection well completed into the water zone at a point different from the well through which the solvent was injected. If there is no water zone 14 underlying the reservoir 10 shown in the drawings, the solvent and water are injected into the vicinity of the lower portion of the reservoir.

Reservoir 12 shown in the drawing does not have a gas cap; and in a reservoir having a gas cap the produced oil is preferably withdrawn substantially at the interface between the gas cap and the reservoir oil, and from other intermediate wells between the injection wells and the gas-oil interface.

If the reservoir oil has a viscosity low enough that dilution with a solvent is not required for ease of production of the oil, the solvent injection and solvent stimulation steps can be eliminated. In such a case, water would be injected into the reservoir via the injection well substantially at the interface between the light reservoir oil and the underlying water zone or into the lower portion of the reservoir if there is no water zone. Injection of the water is continued to drive the light oil through the reservoir toward a production well where it is recovered. The rate of water injection is controlled low enough to maintain an essentially horizontal water-oil interface so that the water does not finger into the oil and decrease its displacement efficiency. Production of oil is continued until there is a breakthrough of water at the production well.

I claim:

1. A method for recovering oil from a subterranean oil reservoir penetrated by at least one injection well and at least one production well spaced apart in the reservoir, said reservoir having in one area an appreciable dip and having a water zone in fluid communication with and directly below an oil zone to form an oil-water interface, said method comprising the steps of:
    (a) injecting a quantity of solvent for the oil into said reservoir via said injection well in the vicinity of said oil-water interface having a density less than the reservoir oil so as to contact the reservoir oil, finger upwardly into the oil, dissolve and lower said reservoir oil's viscosity;
    (b) thereafter injecting water into the reservoir via said injection well to drive the solvent through the reservoir and adjusting the rate of the injection so that the interface between the solvent and the water is maintained in a substantially horizontal position to minimize fingering of the water into the solvent; and
    (c) recovering oil from said production well.

2. A method as defined in claim 1 wherein the amount of solvent injected is between 5 and 25% reservoir pore volume.

3. A method as defined in claim 1 wherein the amount of solvent injected is 10% reservoir pore volume.

4. A method for recovering oil from a subterranean oil reservoir penetrated by at least one injection well and one production well spaced apart in the reservoir, said reservoir having in one area an appreciable dip and containing an oil zone, said method comprising the steps of:
    (a) injecting a quantity of solvent for the oil into the reservoir via said injection well in the vicinity of the lower portion of said reservoir having a density less than the reservoir oil so as to contact the reservoir oil, finger upwardly into the oil, dissolve and lower said reservoir oil's viscosity;
    (b) thereafter injecting water into the reservoir via said injection well to drive the solvent through the reservoir and adjusting the rate of the injection so that the interface between the solvent and the water is maintained in a substantially horizontal position to minimize fingering of the water into the solvent; and
    (c) recovering oil from said production well.

5. A method as defined in claim 4 wherein the amount of solvent injected is between 5 and 25% reservoir pore volume.

6. A method as defined in claim 4 wherein the amount of solvent injected is 10% reservoir pore volume.

7. A method for recovering oil from a subterranean oil reservoir penetrated by at least one injection well and one production well spaced apart in the reservoir, said reservoir having in one area an appreciable dip and having a water zone in fluid communication with and directly below an oil zone to form an oil-water interface, said method comprising the steps of:
    (a) injecting a quantity of first solvent for the oil into said reservoir via said injection well in the vicinity of said oil-water interface having a density less than the reservoir oil so as to contact the reservoir oil, finger upwardly into the oil, dissolve and lower said reservoir oil's viscosity;
    (b) thereafter injecting water into the reservoir via said injection well to drive the first solvent through the reservoir toward said production well;
    (c) concurrently with said water injection step (b), injecting 2 to 50 barrels per foot of vertical thickness of said reservoir a second solvent for the oil into the reservoir via said production well;
    (d) opening said production well to production;
    (e) continuing injection of said water into the reservoir via said injection well to force said first solvent through the reservoir and adjusting the rate of the injection so that the interface between the solvent and the water is maintained in a substantially horizontal position to minimize fingering of the water into the solvent;
    (f) recovering oil from said production well until the concentration of said second solvent in the produced oil becomes less than 12% by volume;
    (g) repeating steps (c) through (f) until the recovered oil contains substantial concentrations of said first solvent; and
    (h) recovering a mixture of oil and first solvent from said production well.

8. A method as defined in claim 7 wherein the amount of first solvent injected into the reservoir during step (a) is between 5 and 25% reservoir pore volume.

9. A method as defined in claim 7 wherein the amount of first solvent injected into the reservoir during step (a) is 10% reservoir pore volume.

10. A method for recovering oil from a subterranean oil reservoir penetrated by at least one injection well and one production well spaced apart in the reservoir, said reservoir having in one area an appreciable dip and containing an oil zone, said method comprising the steps of:
    (a) injecting a quantity of first solvent for the oil into said reservoir via said injection well in the vicinity of the lower portion of said reservoir having a density less than the reservoir oil so as to contact the reservoir oil, finger upwardly into the oil, dissolve and lower said reservoir oil's viscosity;
    (b) thereafter injecting water into the reservoir via said injection well to drive the first solvent through the reservoir toward said production well;

(c) concurrently with said water injection step (b), injecting 2 to 50 barrels per foot of vertical thickness of said reservoir a second solvent for the oil into the reservoir via said production well;

(d) opening said production well to production;

(e) continuing injection of said water into the reservoir via said injection well to force said first solvent through the reservoir and adjusting the rate of the injection so that the interface between the solvent and the water is maintained in a substantially horizontal position to minimize fingering of the water into the solvent;

(f) recovering oil from said production well until the concentration of said second solvent in the produced oil becomes less than 12% by volume;

(g) repeating steps (c) through (f) until the recovered oil contains substantial concentrations of said first solvent; and (h) recovering a mixture of oil and first solvent from said production well.

11. A method as defined in claim 10 wherein the amount of first solvent injected into the reservoir during step (a) is between 5 and 25% reservoir pore volume.

12. A method as defined in claim 10 wherein the amount of first solvent injected into the reservoir during step (a) is 10% reservoir pore volume.

13. A method for recovering oil from a subterranean oil reservoir penetrated by at least one injection well and at least one production well spaced apart in the reservoir, said reservoir having in one area an appreciable dip and having a water zone in fluid communication with and directly below an oil zone to form an oil-water interface, said method comprising the steps of:

(a) injecting a quantity of solvent for the oil into said reservoir via said injection well in the vicinity of said oil-water interface having a density less than the reservoir oil so as to contact the reservoir oil, finger upwardly into the oil, dissolve and lower said reservoir oil's viscosity;

(b) allowing the reservoir to undergo a soak period for a variable time to further enable the injected solvent to finger upwardly into the reservoir oil thereby reducing its viscosity;

(c) thereafter injecting water into the reservoir via said injection well to drive the solvent through the reservoir and adjusting the rate of the injection so that the interface between the solvent and the water is maintained in a substantially horizontal position to minimize fingering of the water into the solvent; and (d) recovering oil from said production well.

14. A method as defined in claim 13 wherein the amount of solvent injected is between 5 and 25% reservoir pore volume.

15. A method as defined in claim 13 wherein the amount of solvent injected is 10% reservoir pore volume.

16. A method for recovering oil from a subterranean oil reservoir penetrated by at least one injection well and one production well spaced apart in the reservoir, said reservoir having in one area an appreciable dip and containing an oil zone, said method comprising the steps of:

(a) injecting a quantity of solvent for the oil into said reservoir via said injection well in the vicinity of said oil-water interface having a density less than the reservoir oil so as to contact the reservoir oil, finger upwardly into the oil, dissolve and lower said reservoir oil's viscosity;

(b) allowing the reservoir to undergo a soak period for a variable time to further enable the injected solvent to finger upwardly into the reservoir oil thereby reducing its viscosity;

(c) thereafter injecting water into the reservoir via said injection well to drive the solvent through the reservoir and adjusting the rate of the injection so that the interface between the solvent and the water is maintained in a substantially horizontal position to minimize fingering of the water into the solvent; and (d) recovering oil from said production well.

17. A method as defined in claim 16 wherein the amount of solvent injected is between 5 and 25% reservoir pore volume.

18. A method as defined in claim 16 wherein the amount of solvent injected is 10% reservoir pore volume.

19. A method for recovering oil from a subterranean oil reservoir penetrated by at least one injection well and one production well spaced apart in the reservoir, said reservoir having in one area an appreciable dip and having a water zone in fluid communication with and directly below an oil zone to form an oil-water interface, said method comprising the steps of:

(a) injecting a quantity of solvent for the oil into said reservoir via said injection well in the vicinity of said oil-water interface having a density less than the reservoir oil so as to contact the reservoir oil, finger upwardly into the oil, dissolve and lower said reservoir oil's viscosity;

(b) allowing the reservoir to undergo a soak period for a variable time to further enable the injected solvent to finger upwardly into the reservoir oil thereby reducing its viscosity;

(c) thereafter injecting water into the reservoir via said injection well to drive the first solvent through the reservoir toward said production well;

(d) concurrently with said water injection step (b), injecting 2 to 50 barrels per foot of vertical thickness of said reservoir a second solvent for the oil into the reservoir via said production well;

(e) opening said production well to production;

(f) continuing injection of said water into the reservoir via said injection well to force said first solvent through the reservoir and adjusting the rate of the injection so that the interface between the solvent and the water is maintained in a substantially horizontal position to minimize fingering of the water into the solvent;

(g) recovering oil from said production well until the concentration of said second solvent in the produced oil becomes less than 12% by volume;

(h) repeating steps (c) through (f) until the recovered oil contains substantial concentrations of said first solvent; and (i) recovering a mixture of oil and first solvent from said production well.

20. A method as defined in claim 19 wherein the amount of first solvent injected into the reservoir during step (a) is between 5 and 25% reservoir pore volume.

21. A method as defined in claim 19 wherein the amount of first solvent injected into the reservoir during step (a) is 10% reservoir pore volume.

22. A method for recovering oil from a subterranean oil reservoir penetrated by at least one injection well and one production well spaced apart in the reservoir, said reservoir having in one area an appreciable dip and containing an oil zone, said method comprising the steps of:

(a) injecting a quantity of solvent for the oil into said reservoir via said injection well in the vicinity of said oil-water interface having a density less than the reservoir oil so as to contact the reservoir oil, finger upwardly into the oil, dissolve and lower said reservoir oil's viscosity;

(b) allowing the reservoir to undergo a soak period for a variable time to further enable the injected solvent to finger upwardly into the reservoir oil thereby reducing its viscosity;

(c) thereafter injecting water into the reservoir via said injection well to drive the first solvent through the reservoir toward said production well;

(d) concurrently with said water injection step (b), injecting 2 to 50 barrels per foot of vertical thickness of said reservoir a second solvent for the oil into the reservoir via said production well;

(e) opening said production well to production;

(f) continuing injection of said water into the reservoir via said injection well to force said first solvent through the reservoir and adjusting the rate of the injection so that the interface between the solvent and the water is maintained in a substantially horizontal position to enable the injected solvent to finger upwardly into the reservoir oil thereby reducing its viscosity;

(g) recovering oil from said production well until the concentration of said second solvent in the produced oil becomes less than 12% by volume;

(h) repeating steps (c) through (f) until the recovered oil contains substantial concentrations of said first solvent; and (i) recovering a mixture of oil and first solvent from said production well.

23. A method as defined in claim 22 wherein the amount of first solvent injected into the reservoir during step (a) is between 5 and 25% reservoir pore volume.

24. A method as defined in claim 22 wherein the amount of first solvent injected into the reservoir during step (a) is 10% reservoir pore volume.

* * * * *